United States Patent [19]

Grammas et al.

[11] Patent Number: 4,535,533

[45] Date of Patent: Aug. 20, 1985

[54] CABLE CONNECTOR SEATING TOOL

[75] Inventors: James J. Grammas, Westchester; Walter J. Moskal, Chicago; Craig J. Witt, Schaumburg, all of Ill.

[73] Assignee: GTE Automatic Electric Incorporated, Northlake, Ill.

[21] Appl. No.: 562,879

[22] Filed: Dec. 19, 1983

[51] Int. Cl.³ .............................................. B23P 19/02

[52] U.S. Cl. .......................................... 29/749; 29/270

[58] Field of Search ................. 29/749, 750, 751, 752, 29/753, 754, 758–761, 270, 281.1; 339/45 R, 45 M, 46; 269/1

[56] References Cited

U.S. PATENT DOCUMENTS

| | | | |
|---|---|---|---|
| 3,640,519 | 2/1972 | Halstead | 29/760 |
| 3,697,928 | 10/1972 | Hammell | 339/45 M |
| 3,949,467 | 4/1976 | Mayala et al. | 29/752 |

*Primary Examiner*—Howard N. Goldberg
*Assistant Examiner*—P. W. Echols
*Attorney, Agent, or Firm*—Charles A. Doktycz

[57] ABSTRACT

A tool for facilitating the insertion of miniature cable connectors into mating receptacles from both top and bottom. The bottom includes guide arms to maintain the contact pins in proper alignment until entry into a mating receptacle is made.

2 Claims, 2 Drawing Figures

CABLE CONNECTOR SEATING TOOL

FIELD OF THE INVENTION

This invention relates to devices and apparatus for interconnecting electrical conductors and terminals of electrical components and the like and, more particularly to tools for facilitating such interconnections.

BACKGROUND OF THE INVENTION

Because of the constant pressure for smaller packaging of electronic system components, printed wiring cards have been designed employing a mother board-baby board concept. This approach can frequently eliminate the need for two separate full sized sparsely populated card assemblies with a densely populated card and a smaller card mounted thereon. This smaller card, however, must be electrically and functionally connected to its mother card. This connection is frequently achieved by the use of an "umbilical" cable to the mother board. The umbilical connection uses a standard cable connector. The wires are grouped together and terminated at each end into a multi-pin connector. Such a multi-pin is made having two rows of terminals spaced apart about 5/16 of an inch, and a 3/32 spacing between pins. This connector must be pressed into a socket which is soldered to the card. To assure good electrical contact, the fit of the connector into the socket must be very firm. The holes in the socket which receive the pins have spring inserts to resiliently engage the connector pins. During assembly of the connector to the socket one of the pins, although lined up prior to insertion, may become bent and folded under the body of the connector. Because the socket is surrounded by many other components this defect cannot be seen by any visual inspection process and is not detected until final electrical functional testing. Since there may be a plurality of such connectors on a single card the chances of such an occurrence can result in an excessive reject rate of the printed circuit cards. The resultant looping of a defective card through testing, analyzing, repairing and retesting is extremely expensive from a labor and inventory standpoint and is disruptive to scheduling.

SUMMARY OF THE INVENTION

Accordingly, it is a primary object of this invention to provide a means for eliminating the cause of these defects.

Another object is to provide a tool that is simple and easy to use that will prevent the fold-over of the contact pins.

These and other objects and features are achieved by a tool that receives the connector and includes tines that restrain the contact pins for proper insertion into the mating socket.

BRIEF DESCRIPTION OF THE DRAWING

The principles of the invention will be better understood from a consideration of the detailed description of one illustrative embodiment thereof when taken in conjunction with the accompanying drawing in which.

DESCRIPTION OF THE PREFERRED EMBODIMENT

Figure 1:
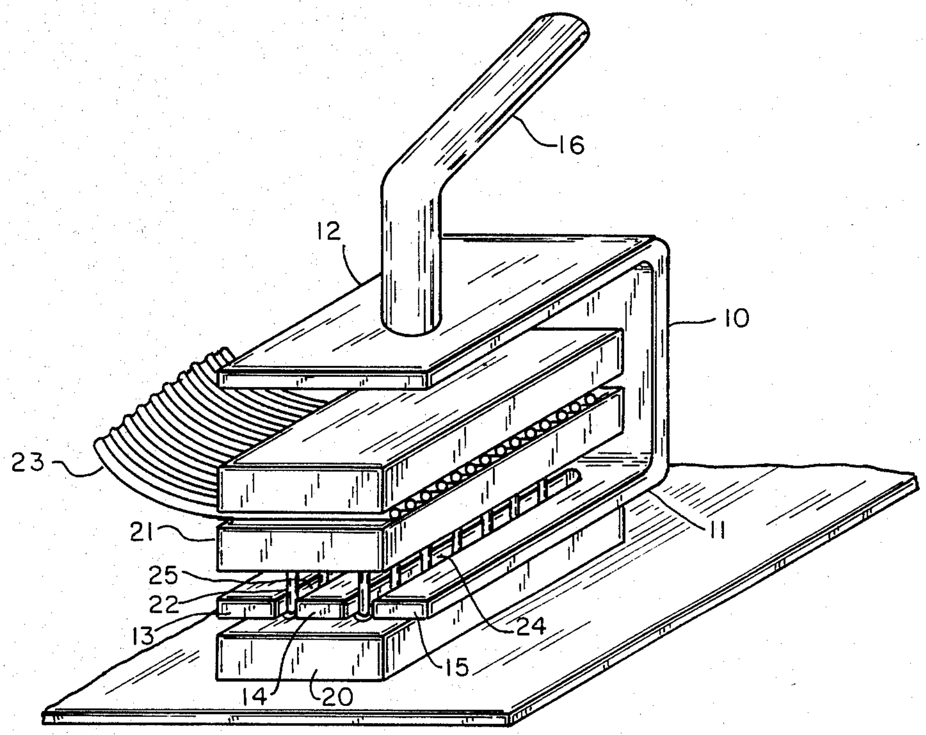
FIG. 1 is a perspective view of the tool with a multi-conductor connector therein prior to insertion into a mating receptacle.

This new design connector terminal guiding and seating tool which prevents the terminals from folding under as shown in FIG. 1 is generally configured as a large "U" having a base portion 10 and two parallel arms 11 and 12. The spacing between the arms 11 and 12 is adequate for the easy entry of a connector, in the illustrated embodiment it is approximately $\frac{1}{3}$ inch. The arms are about $\frac{1}{2}$ inch wide, with the upper arm projecting from the base 10 about $\frac{1}{2}$ inch and the lower arm 11 projecting approximately $\frac{7}{8}$ of an inch. A round rod handle 16 is included and is mounted on the upper arm 12. The lower arm 11 as seen in the drawing is split by slots 25 and 24 into a shape generally resembling an "E" shape, having outer tines 13 and 15 and a central tine 14. The tines are of a thickness such that the connector pins will project about one-half of their length out of the tool, beyond the lower arm.

Figure 2:
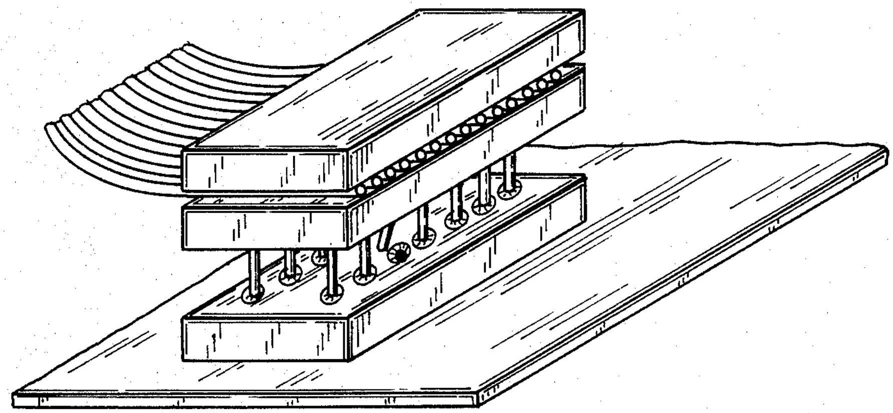
FIG. 2 is another perspective view showing a multi-conductor connector in the process of being inserted into a mating receptacle illustrating how a conductor pin becomes bent.

In use a connector such as 21 is inserted into the opening between the arms 11 and 12 with the contact pins such as 22 slipping into the slots 25 and 24. At this stage, should any contact pin not be properly positioned as shown in FIG. 2, it will be readily apparent visually.

The assembler now has only to hold this tool by its handle 16, position the connector and tool over the receptacle 20 and push them together until the pins such as 22 enter the receptacle cavities after which the remaining operation is only to withdraw the tool by pulling it in the direction of the base portion 10 and complete the entry of the pins by pushing down on the top surface of the connector.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A generally "U" shaped tool for facilitating the insertion of a multi-contact miniature connector having a pair of parallel rows of contact pins into a complimentary receptacle and comprising:

- a base portion and a spaced apart pair of parallel arms attached thereto and adapted to receive a connector body therebetween;
- a first of said arms including a first outer tine, a central tine and second outer tine, said central tine thus limiting inward displacement and said outer tines preventing any outward displacement of the contact pins of a contained connector,
- a second of said arms including a handle attached thereto for ease of handling said tool, said handle comprises a rod slanted at an angle with its free end leaning toward said base portion.

2. A generally "U" shaped tool as claimed in claim 1, wherein said second of said arms is shorter than said first arm.

* * * * *